US006963883B1

(12) United States Patent
Creemer et al.

(10) Patent No.: US 6,963,883 B1
(45) Date of Patent: Nov. 8, 2005

(54) METHOD AND APPARATUS FOR PARALLEL EXECUTION OF CONDUITS DURING SIMULTANEOUS SYNCHRONIZATION OF DATABASES

(75) Inventors: David Creemer, Palo Alto, CA (US); Chris Raff, San Francisco, CA (US)

(73) Assignee: PalmSource, Inc., Sunnyvale, CA (US)

( * ) Notice: Subject to any disclaimer, the term of this patent is extended or adjusted under 35 U.S.C. 154(b) by 22 days.

(21) Appl. No.: 10/648,553

(22) Filed: Aug. 25, 2003

Related U.S. Application Data

(63) Continuation of application No. 09/577,208, filed on May 23, 2000, now Pat. No. 6,671,700.

(51) Int. Cl.[7] .............................................. G06F 12/00
(52) U.S. Cl. ........................ 707/201; 707/200; 707/203
(58) Field of Search ..................................... 707/1–205

(56) References Cited

U.S. PATENT DOCUMENTS 6,006,005 A * 12/1999 Okitsu ........................ 386/46
6,452,923 B1 * 9/2002 Gerszberg et al. .......... 370/352
6,477,543 B1 * 11/2002 Huang et al. ................ 707/200
6,718,347 B1 * 4/2004 Wilson ........................ 707/201
2003/0058277 A1 * 3/2003 Bowman-Amuah ......... 345/765

* cited by examiner

Primary Examiner—Luke Wassum
Assistant Examiner—Linh Black
(74) Attorney, Agent, or Firm—Berry & Associates P.C.

(57) ABSTRACT

Sharing information between a host computer system and a peripheral computer system. Conduit programs running simultaneously on the host computer system synchronize information between the two computer systems. The conduits initiate multiple time multiplexed transfers across a single communication link between the two computer systems. In general, one or more conduits can perform a non-transfer task while another conduit can simultaneously perform a transfer over the host-peripheral communication link. The conduits may be used to load software onto the peripheral computer or to exchange e-mail between the two computer systems. While one active conduit is performing a task that does not involve use of the communication link, the other simultaneously executing conduits can use the communication link to transfer records between the host and the peripheral computer system.

18 Claims, 14 Drawing Sheets

METHOD AND APPARATUS FOR PARALLEL EXECUTION OF CONDUITS DURING SIMULTANEOUS SYNCHRONIZATION OF DATABASES

RELATED APPLICATION

This application is a continuation of commonly-owned U.S. patent application Ser. No. 09/577,208 filed May 23, 2000, which has become U.S. Pat. No. 6,671,700, entitled "Method And Apparatus for Parallel Execution of Conduits During Synchronization of Databases" to Creemer et al.

BACKGROUND OF THE INVENTION

1. Field of the Invention

The present invention relates to the field of data processing systems. Specifically, the present invention relates to a method and apparatus for efficiently synchronizing information between a portable computer system and a host computer system.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a keyboard device, some palmtop computers utilize a touch screen and display an image of a small keyboard thereon. When a particular button is pressed or tapped, a small keyboard image is displayed on the display screen. Instead of using a keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand. Most of these pen-based palmtop computer systems provide some type of handwriting recognition system whereby the user can write words and letters on the digitizer pad with a stylus.

In addition to using keyboards, virtual keyboards and the digitizer, it has also proven convenient to exchange data between a computer system and a palmtop computer using a communication interface, such as a serial or parallel input port. Alternatively, infrared (IR) or wireless radio frequency communication may be used for the interface. A number of programs today transfer data between palmtops and personal computer systems (PCs), but they are currently limited in functionality. For instance, some programs transfer all the information from the palmtop to the PC without regard for the prior content on the PC. These programs assume that changes to that particular data are only made on the palmtop, and that the changes made on the palmtop take precedence over any changes made on the PC. As a result, any independent updates made directly on the PC will be lost.

Other programs make inefficient use of the communication link between the two computer systems. Frequently, the user may wish to synchronize several applications, such as an appointment book, an address book, and an electronic notepad application. The same program is used to synchronize all applications, but the applications are synchronized serially. FIG. 1 illustrates the use of the communication link over time for three applications being synchronized serially. A, B, and C represent the time when the respective synchronizing program is using the communication link to synchronize application A, B, or C. Unfortunately, for a considerable portion of the time, the communication link is idle. For example, the communication link is idle when the synchronizing program is comparing records transferred from the palmtop with records on the host computer. This comparison process can be computationally intensive, and hence very time consuming. After the comparison phase is done, selected records are than transferred over the communication link. Also, the synchronizing program must wait for the palmtop to respond to its request for information—resulting in a latency period when the link is idle. Additionally, the host computer may have a relatively slow hard drive, causing idle time on the link while the synchronizing program waits for host data. Consequently, there are numerous reasons for the communication link to be idle for much of the time during synchronization.

As a consequence of the inefficient use of the communication link, the synchronization process can be expensive. For example, if the communication link is via a cellular link, the user is paying a high access fee even during the time the communication link is idle. Clearly it is undesirable to have an idle communication link whenever the user pays for connection time, whether the link is cellular or otherwise.

If the user has a palmtop connected to a host computer via a serial cable, connection fees are not a severe issue; however, the lengthy synchronization time is a problem. Palmtops have many application programs which need to be synchronized and will only find more applications in the future. Programs which synchronize one application at a time force the user to wait a substantial period of time for the synchronization of all of the application programs to complete. Inconvenient synchronization can lead to users not performing synchronization as much as they should, which is a very undesirable result.

Other systems, such as those described in U.S. Pat. No. 5,727,202, U.S. Pat. No. 5,832,489, U.S. Pat. No. 5,884,323 and U.S. Pat. No. 6,000,000 allow data synchronization between a portable computer system and a desktop computer system for the exchange and updating of data. However, like the above described systems, these synchronization systems are serial and they can be time consuming and can make inefficient use of the communication link.

SUMMARY OF THE INVENTION

Accordingly, what is needed is an effective mechanism and method of synchronizing information between a palmtop computer system and a host computer system, while making efficient use of the communication link between the two computer systems. What is also needed is a cost effective system and method for synchronizing information, in particular a system with low data transmission costs. What is further needed is a method and mechanism for rapidly synchronizing all application programs between two computer systems. The present invention provides these advantages and others not specifically mentioned above but described in the sections to follow.

A method and system of sharing information between a host computer system and a peripheral computer system is disclosed. A plurality of conduit programs running simultaneously on the host computer system synchronize information between the two computer systems. The conduits initiate multiple interleaved requests to transfer information across a single communication link between the two computer systems. Thus, the conduits initiate time multiplex transfers across the single communication link. In general, one or more conduits can perform a non-transfer task while another conduit can simultaneously perform a transfer over the host-peripheral communication link. In one embodiment, if more than one conduit initiates a request to transfer information at one time, arbitration is used to order access to the communication link. In another embodiment, the conduits synchronize records between corresponding databases on each computer system. In other embodiments, the conduits are used to load software onto the peripheral computer or to exchange e-mail between the two computer systems. While one active conduit is performing a task that does not involve use of the communication link, the other simultaneously executing conduit can be using the communication link to transfer records between the host and the palmtop.

More specifically, an embodiment of the present invention includes a method of sharing information between a host computer system and an electronic device comprising the steps of: a) establishing a communication link between the host computer system and the electronic device; b) creating a conduit program database on the host computer system, the conduit program database for storing a list of conduit programs to be executed; c) simultaneously executing a plurality of conduit programs on the host computer system, the conduit programs selected from the conduit program database; and d) the conduit programs simultaneously synchronizing information on the host computer system with associated information on the electronic device, wherein the conduit programs time multiplex information transfers over the communication link while they execute simultaneously.

In another embodiment, while a first conduit initiates transfers across the communication link, a second conduit simultaneously performs a non-transfer function. Next, the second conduit initiates a transfer while the first conduit simultaneously performs a non-transfer function. Thus, idle time on the communication link is minimized.

DETAILED DESCRIPTION OF THE INVENTION

In the following detailed description of the present invention, a method and system of synchronizing information between two computer systems using parallel executing conduits that time multiplex information transfers over a single communication link, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EXEMPLARY PALMTOP PLATFORM

Figure 1:
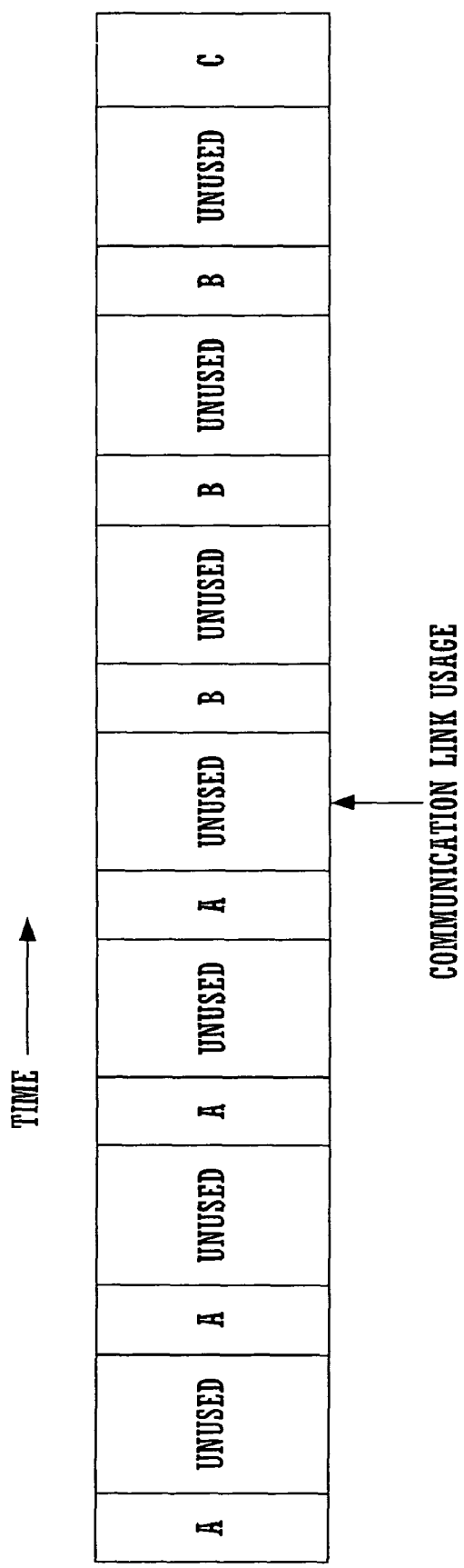
FIG. 1 is a timing diagram of the prior art usage of the communication link over time when synchronizing multiple application programs.
Figure 2:
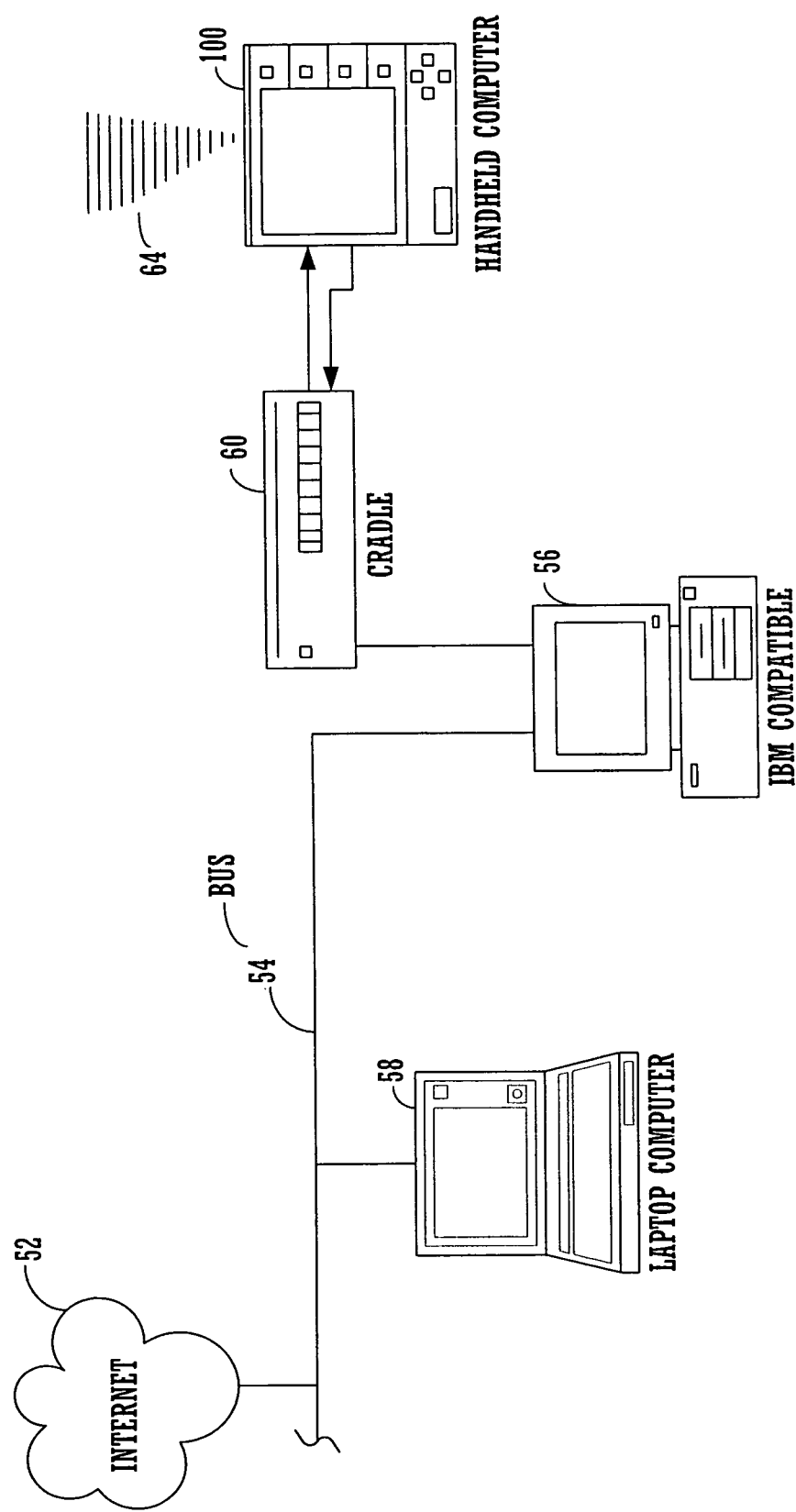
FIG. 2 is system illustration of a palmtop computer system connected to other computer systems and the Internet via a cradle device.

FIG. 2 illustrates a system 50 that can be used in conjunction with various embodiments of the present invention. It is appreciated that the present invention can operate with a variety of host computer and peripheral computer platforms and that system 50 is merely exemplary. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a peripheral computer system, e.g., a palm top ("palm-sized") portable computer system 100. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 3A:
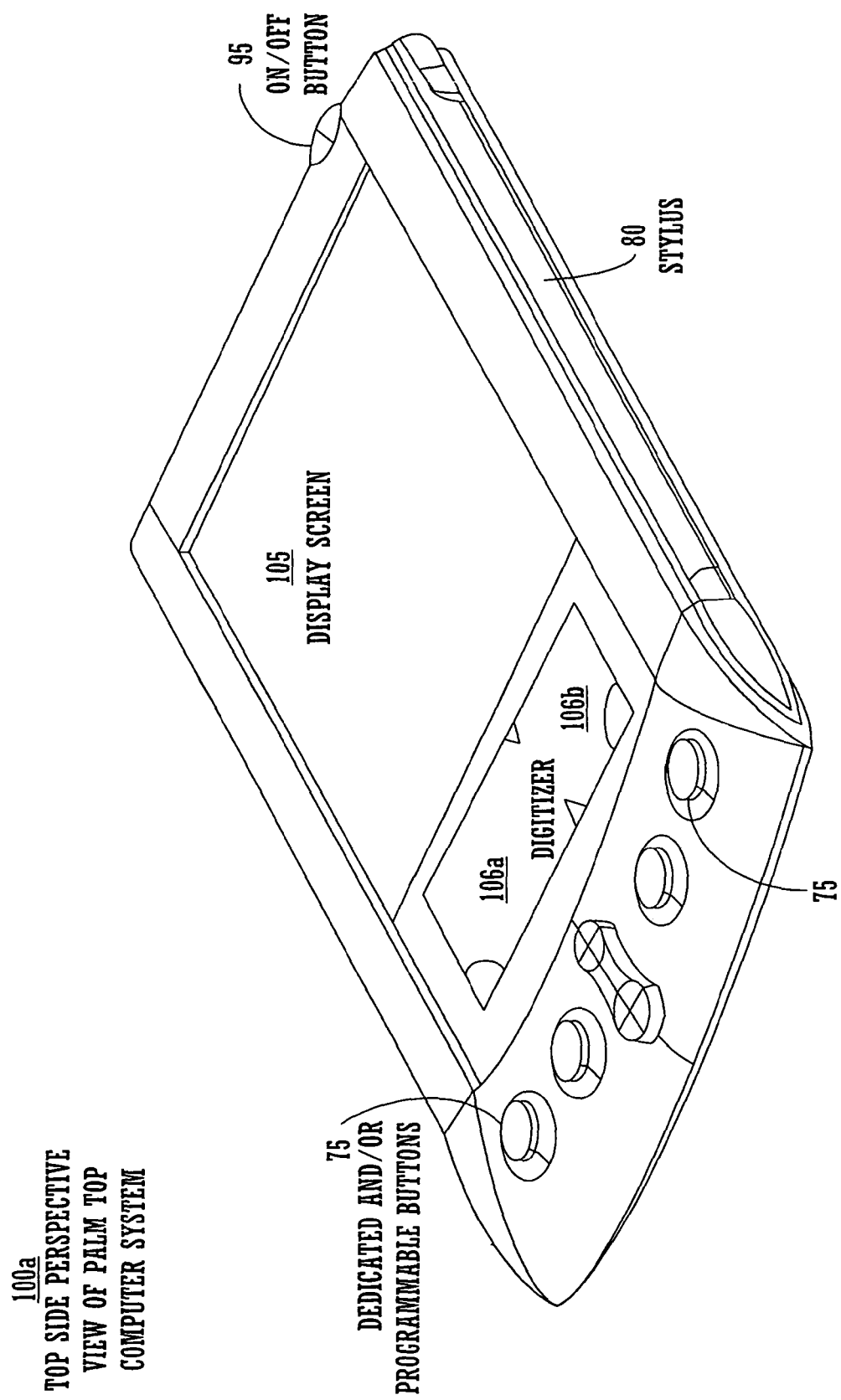
FIG. 3A is a top side perspective view of a palmtop computer system that can be used as a platform for the data entry embodiments of the present invention.

FIG. 3A is a perspective illustration of the top face 100a of one embodiment of the palmtop computer system. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 3A also illustrates a handwriting recognition pad or "digitizer" containing two regions 106a and 106b. Region 106a is for the drawing of alphabetic characters therein (and not for numeric characters) for automatic recognition and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3B:
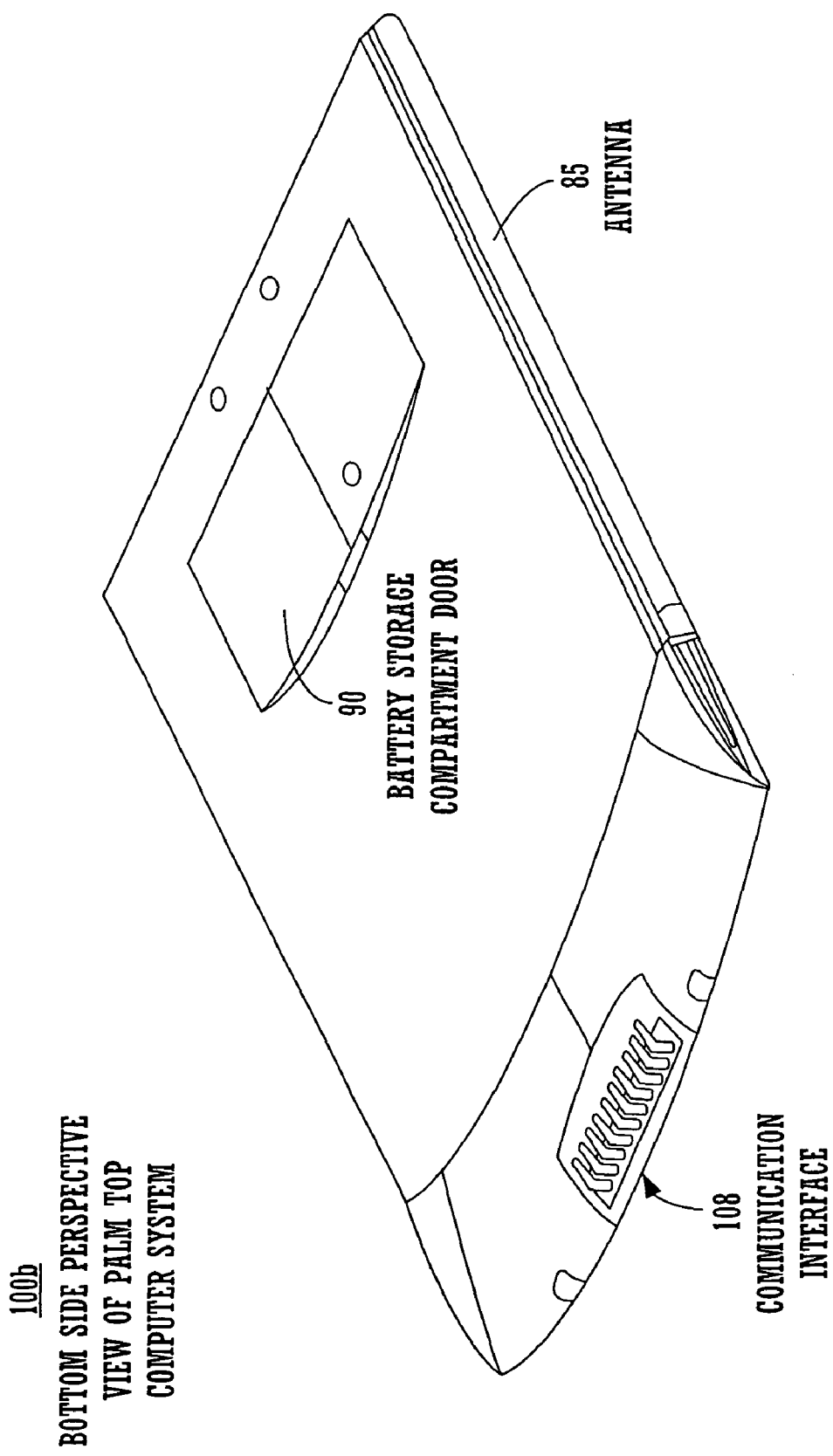
FIG. 3B is a bottom side perspective view of the palmtop computer system of FIG. 3A.

FIG. 3B illustrates the bottom side 100b of one embodiment of the palmtop computer system that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 4:
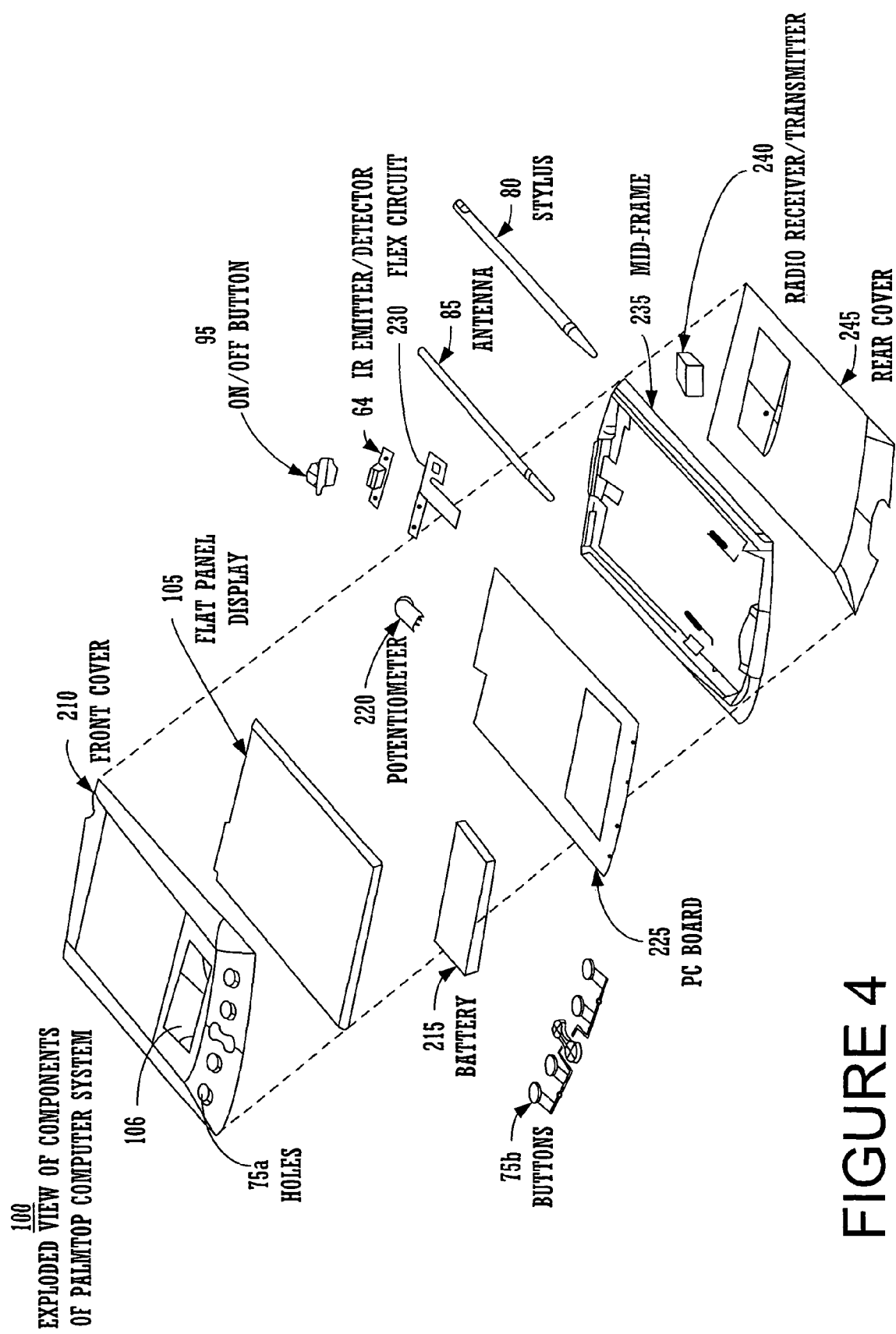
FIG. 4 is an exploded view of the components of the palmtop computer system of FIG. 3A.

FIG. 4 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the mid-frame and the rear cover 245 of FIG. 4. The receiver/transmitter device 240 is coupled to the antenna 85 and also coupled to communicate with the PC board 225. In one implementation the Mobitex® wireless communication system is used to provide two way communication between system 100 and other networked computers and/or the Internet via a proxy server.

Figure 5:
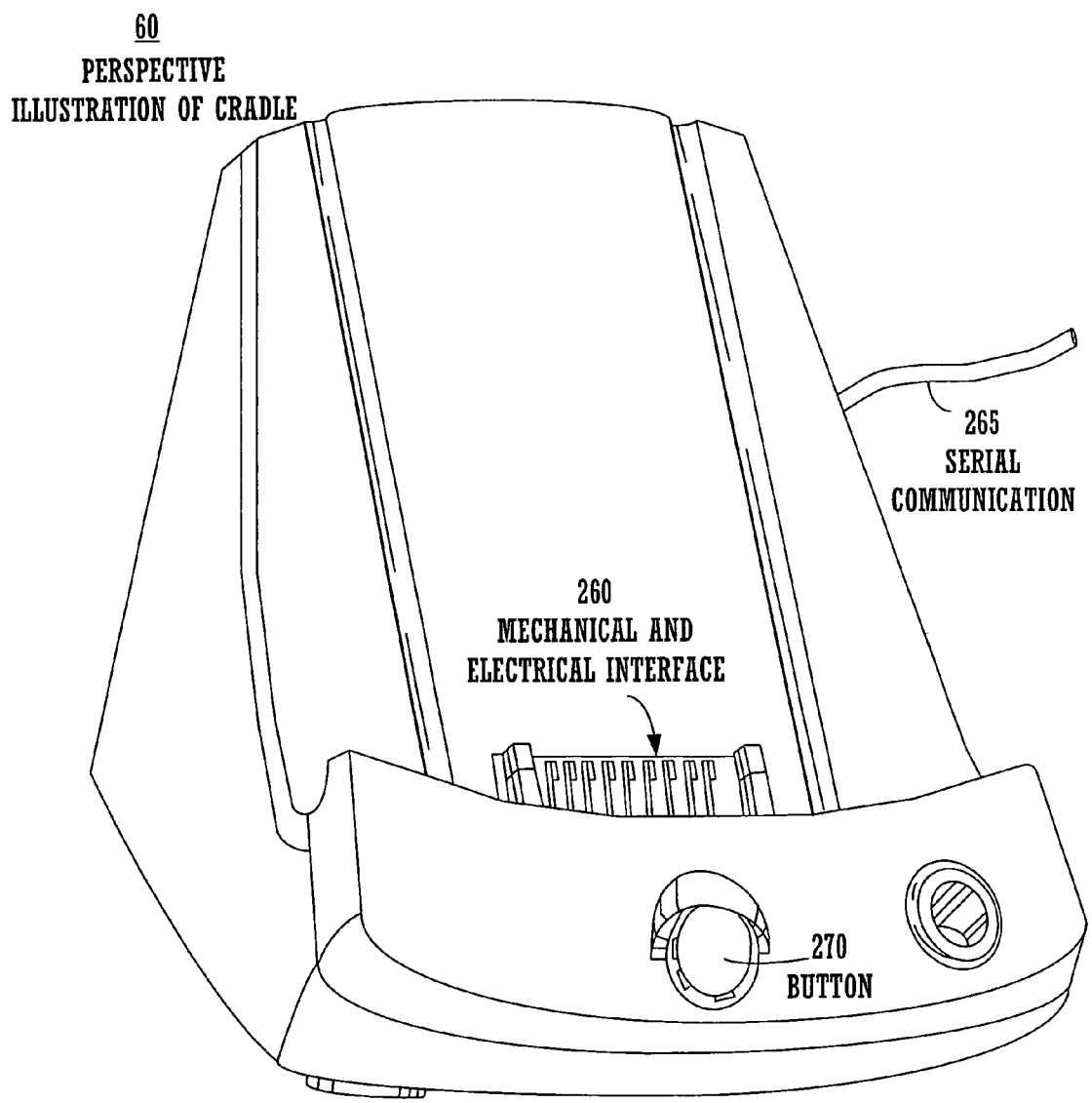
FIG. 5 is a perspective view of the cradle device for connecting the palmtop computer system to other systems via a communication interface.

FIG. 5 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 6:
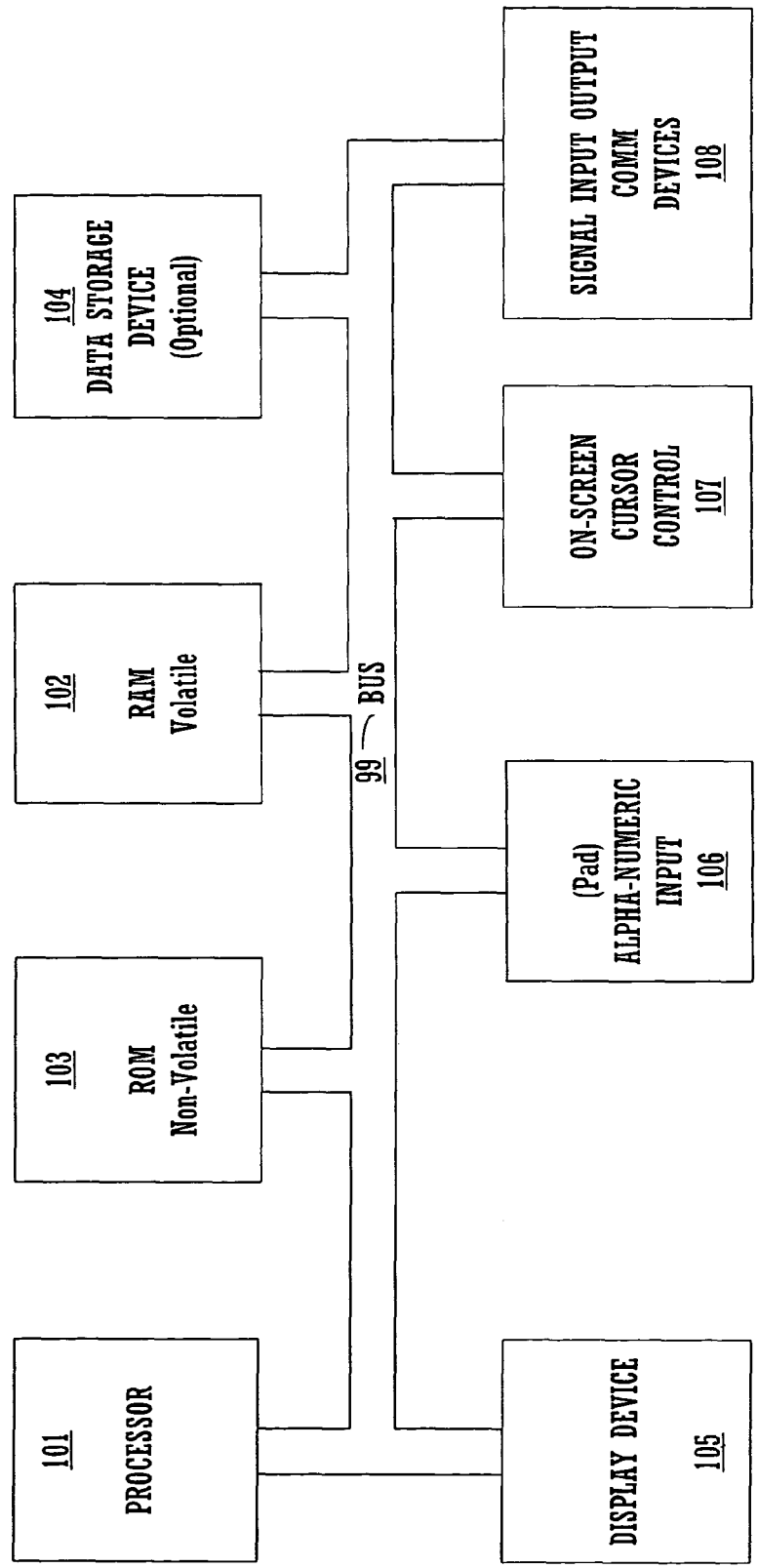
FIG. 6 is a logical block diagram of the palmtop computer system in accordance with an embodiment of the present invention.

FIG. 6 illustrates circuitry of computer system 100, some of which can be implemented on PC board 225. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 6 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 7:
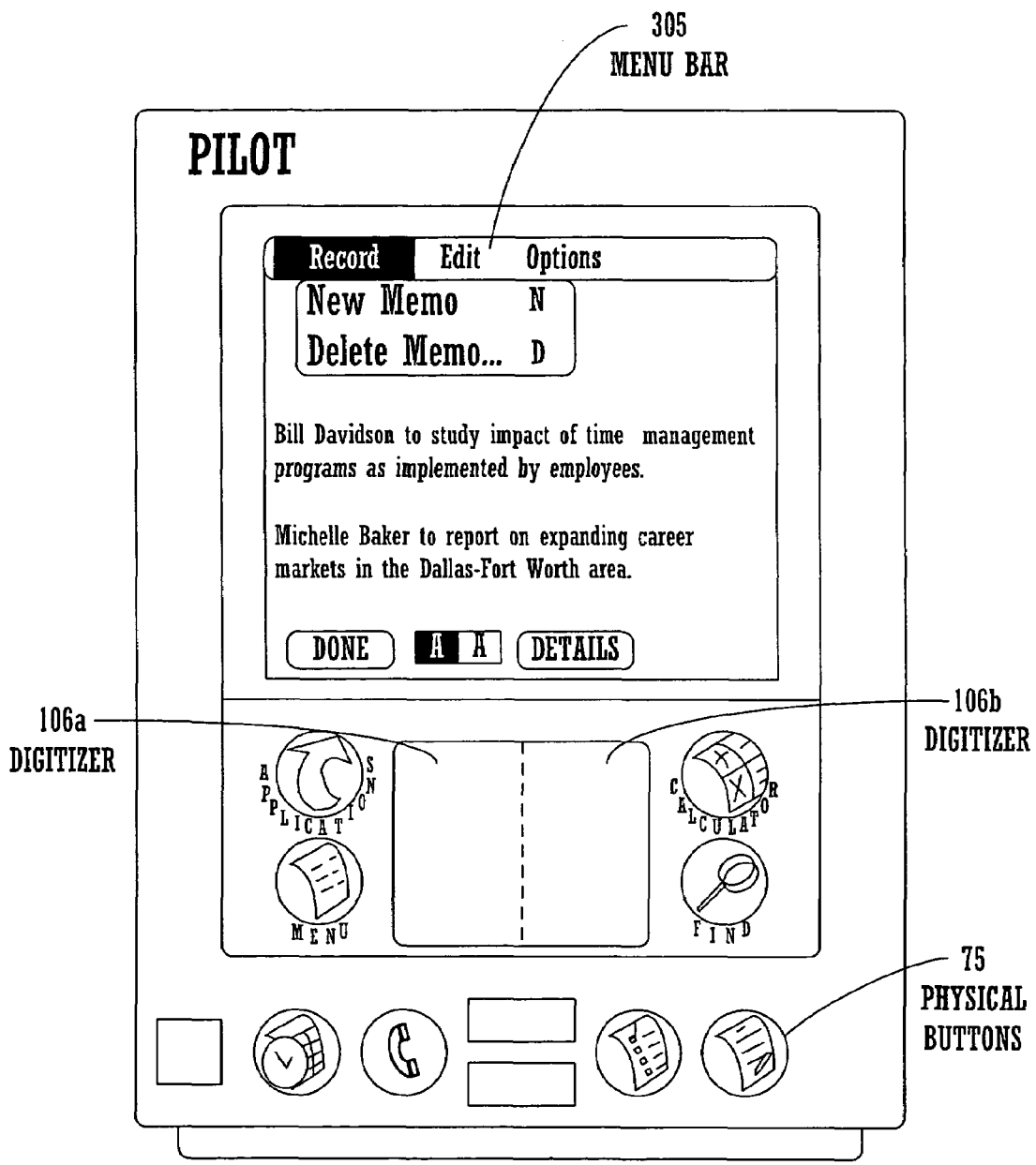
FIG. 7 is a front view of a palmtop computer system illustrating the display screen, digitizer regions and an exemplary menu displayed on the display screen.

FIG. 7 is a front view of the palmtop computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

METHOD AND APPARATUS FOR PARALLEL EXECUTION OF CONDUITS DURING SIMULTANEOUS SYNCHRONIZATION OF DATABASES

Figure 8:
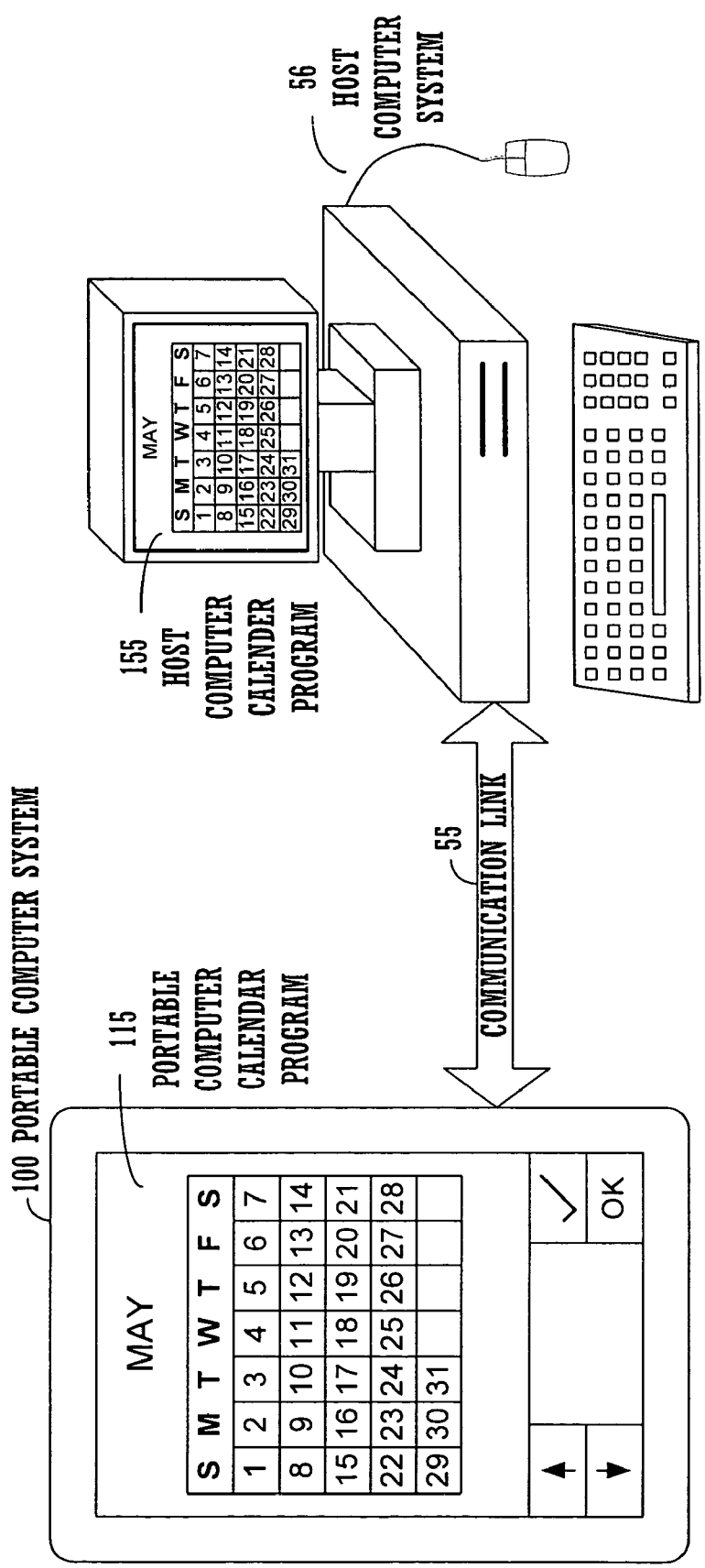
FIG. 8 is a illustration of a palmtop computer system and a host computer system connected by a communication link.

FIG. 8 illustrates a portable computer system 100 and a host computer system 56. In FIG. 8 both the portable computer system 100 and the host computer system 56 are running calendar programs. The user may alter data on either the portable computer calendar program 115 or the host computer calendar program 155. Then, at a later point, the user may couple the two computer systems with communication link 55 and reconcile the two calendar databases. The user will have other application programs, not shown, such as an address book, electronic notepads, and to do lists. The synchronization system of the present invention allows multiple application programs and their associated database records and data to be reconciled (synchronized) simultaneously. That is, the applications are synchronized in parallel rather than one after the other. Consequently, the present system uses the communication link 55 efficiently, as will be described in more detail below.

Figure 9:
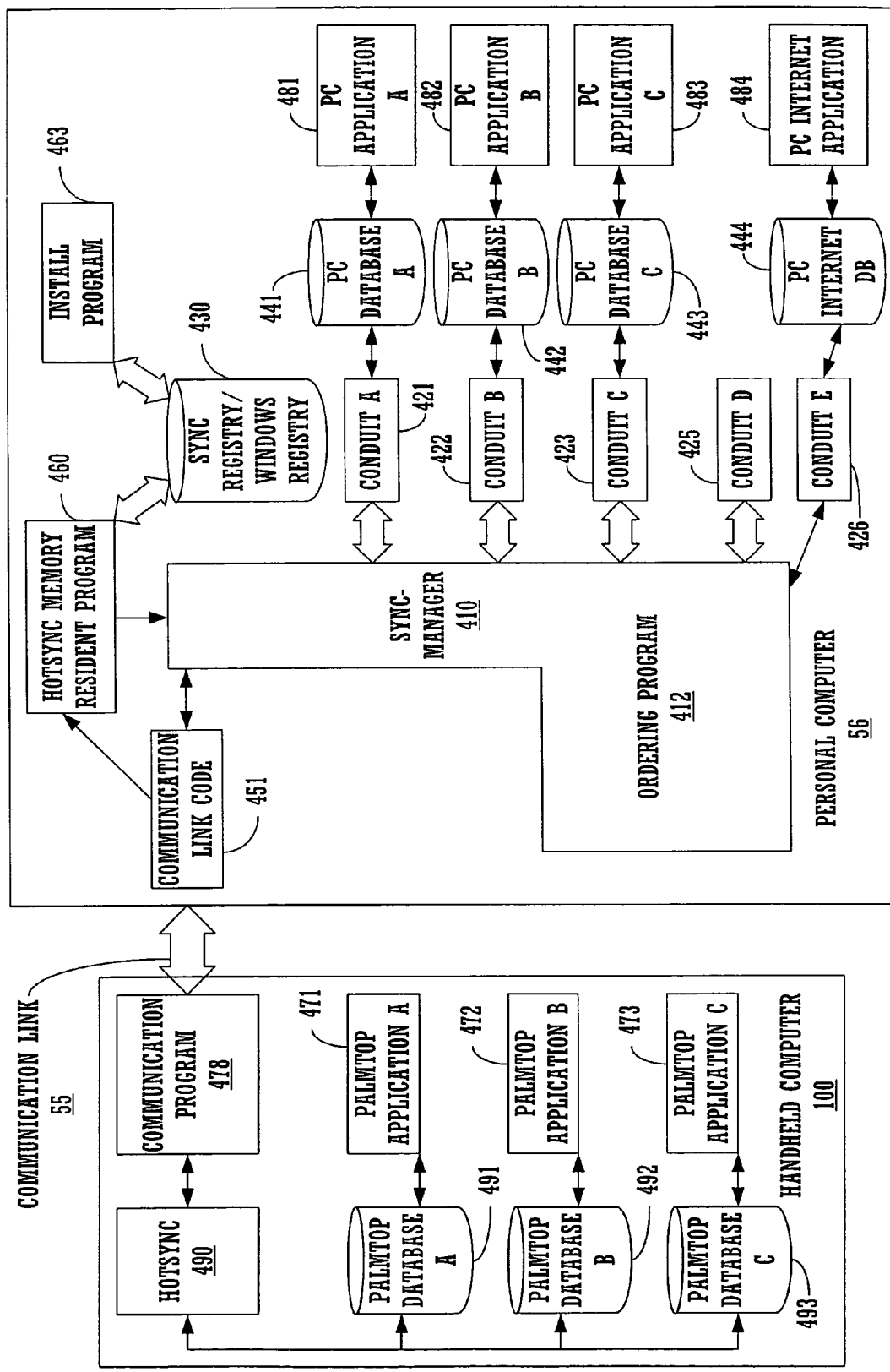
FIG. 9 illustrates a block diagram of the architecture of the parallel execution of conduits during synchronization, in accordance with an embodiment of the present invention.

FIG. 9 illustrates a block diagram of an architecture for synchronizing information on a portable computer 100 with a host computer 56, using time multiplex information transfers. Referring to FIG. 9, palmtop computer 100 has palmtop application A 471, palmtop application B 472, and palmtop application C 473. These applications can be, for instance, an electronic address book, a calendar program, and a to-do list. Each palmtop application (471, 472, 473) has an associated database 491, 492, and 493 respectively. The palmtop computer 100 also has a communication program 478 that handles external communication. Also shown is a HotSync® program 490 on the palmtop computer 100. The HotSync® program manages communication and synchronization between the host computer 56 and the peripheral computer 100.

The host (PC) computer 56 in FIG. 9 has PC application A 481, PC application B 482, PC application C 483, and PC Internet application 484. Each PC application (481, 482, 483, 484) has an associated database 441, 442, 443, 444 respectively. Conduit program A (421) synchronizes PC database A 441 with palmtop database A 491. Likewise, conduit programs B (422), C (423), and E (426) synchronize their associated databases. (Palmtop 100 Internet application and database are not shown.) However, not all conduit programs are used to synchronize data between two databases. Conduit D 425 is such a program. Conduit D 425 may be used to download software to the palmtop 100 or to exchange e-mail between the two computer systems. When a conduit is herein described as "synchronizing information between two computer systems," this encompasses the functions described above for conduits A through E. However, the present invention is not to be limited to these functions, as conduits may perform other information transfers between the two computer systems.

The synchronization software of the present invention comprises HotSync® resident program 460, sync registry 430, and sync manager 410. In one embodiment, the sync manager has ordering program 412 for establishing the order of conduit access to the communication link 55. For example, the ordering program 412 may be an arbitrator. However, the present invention is not limited to using arbitration, as those skilled in the art will recognize that other methods exist for ordering access to the communication link 55. The host computer 56 also has communication link code 451 for external communication. The communication link 55 can be established: i) over serial communication bus 54 (FIG. 2) by using cradle 60 (FIG. 5); ii) via wireless infrared communication by using mechanism 64 (FIG. 4) and a similar mechanism (not shown) in the host computer 65; iii) or via Mobitex® wireless communication system by using radio receiver/transmitter device 240 and antenna 85 (FIG. 4) and a similar device (not shown) in host computer 56. However, the present invention is not limited to these embodiments, as the present invention is well-suited to establishing a communication link 55 on any type of communication pathway between the two computer systems.

The present invention allows two or more of the conduits A–E to be active simultaneously on the computer architecture. In this way, one conduit can be performing tasks that do not require the communication link 55 while at the same time another conduit can be transferring records over the link 55. In this fashion, the link 55 can be efficiently used and synchronization can be done faster. Because multiple conduits are operable simultaneously, ordering program 412 or another ordering method may be used to order the requests for the communication link 55.

Figure 10:
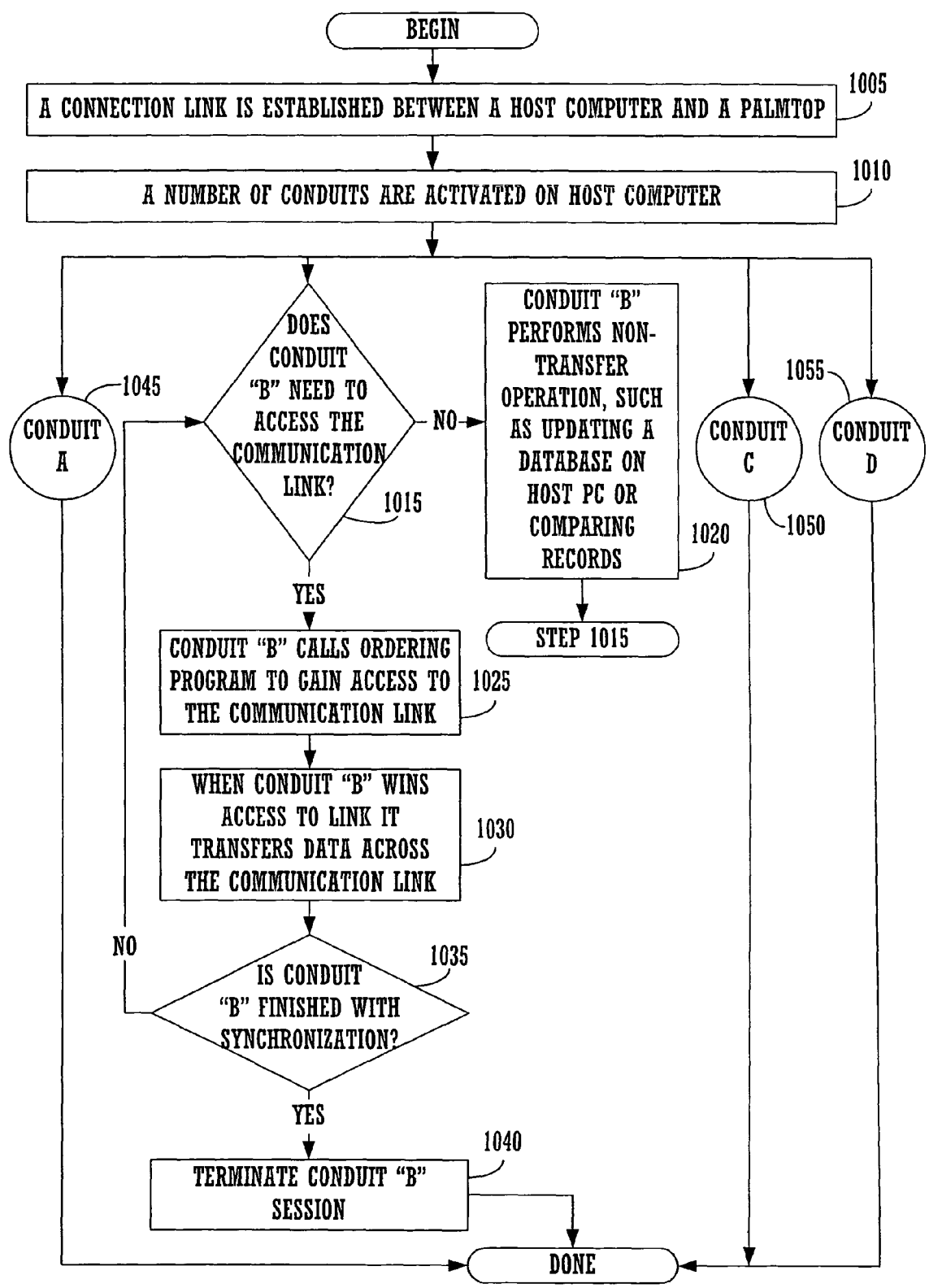
FIG. 10 is a flowchart illustrating the steps of parallel execution of conduits during synchronization, in accordance with an embodiment of the present invention.

FIG. 10 illustrates the steps of synchronizing information using parallel execution of conduits, according to an embodiment of the present invention. In step 1005, a connection link 55 is established between a host computer 56 and a palmtop computer 100.

In step 1010, the sync manager 410 activates a number of conduit programs such that the programs run in parallel. In one embodiment, each conduit program synchronizes information related to one application; however, a conduit could be related to several applications in other implementations. Furthermore, the conduit programs time multiplex information transfers over the communication link 55, as is described in the following steps.

Steps 1015–1040 show a generalized version of the steps conduit B takes when synchronizing information. In steps 1045, 1050, and 1055 conduit A 421, conduit C 423, and conduit D 425 run in parallel with conduit B 422. For clarity, the similar steps taken by all conduits are not shown.

In step 1015, conduit B 422 determines whether it needs to access the communication link 55. If it does not, in step 1020, conduit B 422 performs a non-transfer operation.

(E.g., an operation that does not immediately use the communication link 55, such as updating host database B 442 or comparing records that were transferred from the palmtop 100 with records on host database B 442.) These examples are for illustration, as the non-transfer function will depend on the conduit's function. For example, conduit D 425 may be for downloading software or exchanging e-mail and thus have different non-transfer functions.

If conduit B 422 does need to perform an information transfer, then, at step 1025, it calls the sync manager 410 which contains ordering program 412. It is possible that several conduits will be queued up waiting for access to the communication link 55. While a conduit is waiting for link 55 access, it can be performing non-transfer related functions. This action results in the communication link 55 being used a high percentage of the time. Ordering program 412 orders conduit access to the communication link 55. For embodiments in which the ordering program 412 uses arbitration, the present invention is well-suited to using any type of arbitration, such as round-robin, FIFO, semaphores, or lock and key, etc. Furthermore, other embodiments need not use arbitration to order access to the communication link 55. For example, each conduit may represent its request to transfer data as a bit of data. A queue of requests is maintained, which get handled one at a time.

In step 1030, conduit B has won access to the communication link 55 via arbitration or otherwise and initiates an information transfer. For example, this may be a request that the palmtop to transfer records from palmtop database B 492 which have changed since the last synchronization. It also may be a transfer of records to palmtop database B 492 which conduit B 422 has synchronized.

In step 1035 of FIG. 10, conduit B 422 determines whether it has finished synchronization. If so, in step 1040 conduit B's session is terminated. If conduit B 422 is not done, step 1015 is performed again. The process continues until all conduits are finished. By running the conduits in parallel, overall synchronization task time is reduced as compared to running the conduits serially. Furthermore, by time multiplexing information transfers over the communication link 55, the link 55 is used efficiently.

Figure 11:
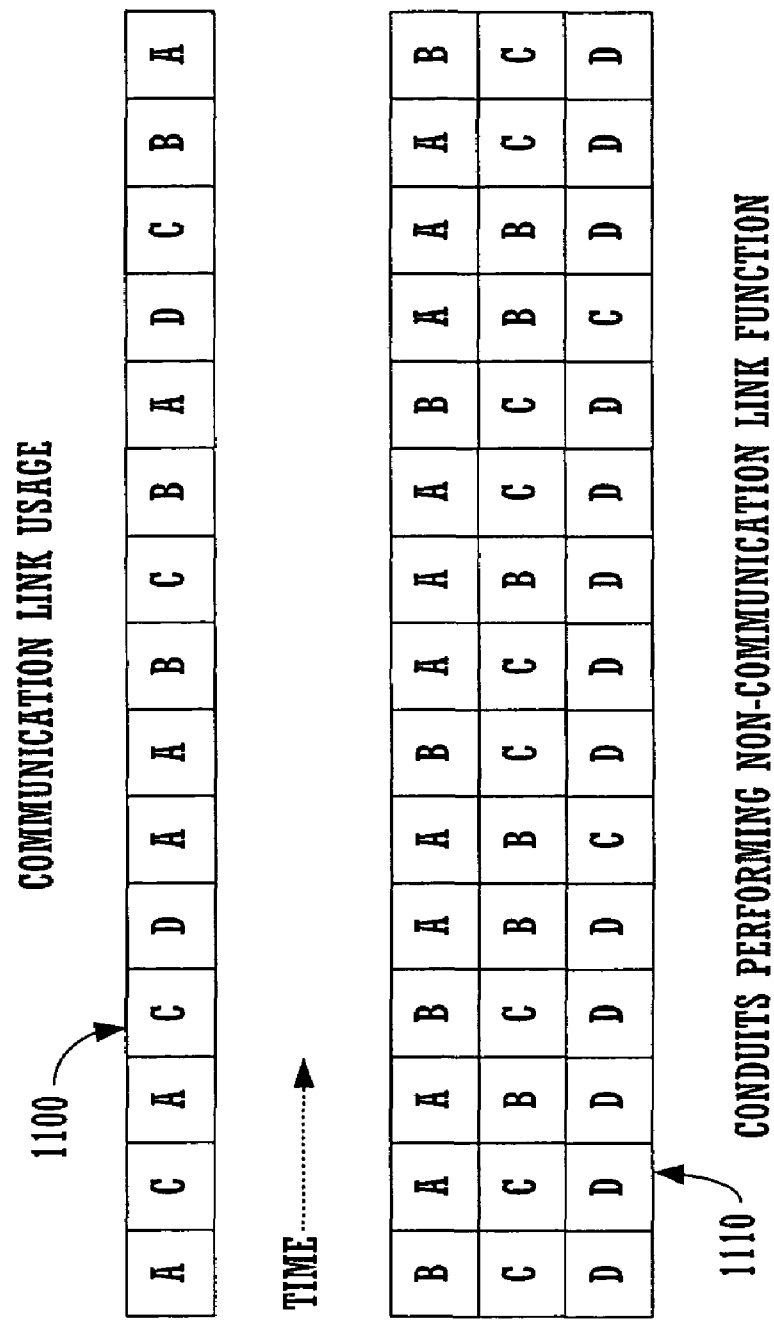
FIG. 11 is an illustration of communication link usage with conduits time multiplexing transfers, in accordance with an embodiment of the present invention.

FIG. 11 illustrates the benefits of time multiplexing information transfers over the communication link 55, according to an embodiment of the present invention. Element 1100 shows the communication link 55 usage over time. Each square represents one time slice. As shown, conduits A–D (421–425) time multiplex information transfers over the communication link 55. As element 1110 shows, while conduit A uses the link 55, the other conduits are performing functions which do not require the link 55. In an ideal situation, the communication link 55 will be used at all times. In one embodiment of the present invention, when a conduit has a request to transfer information queued up, it performs an operation which does not require use of the link 55. Thus, while conduits are waiting for the communication link 55, they are generally not idle.

Figure 12:
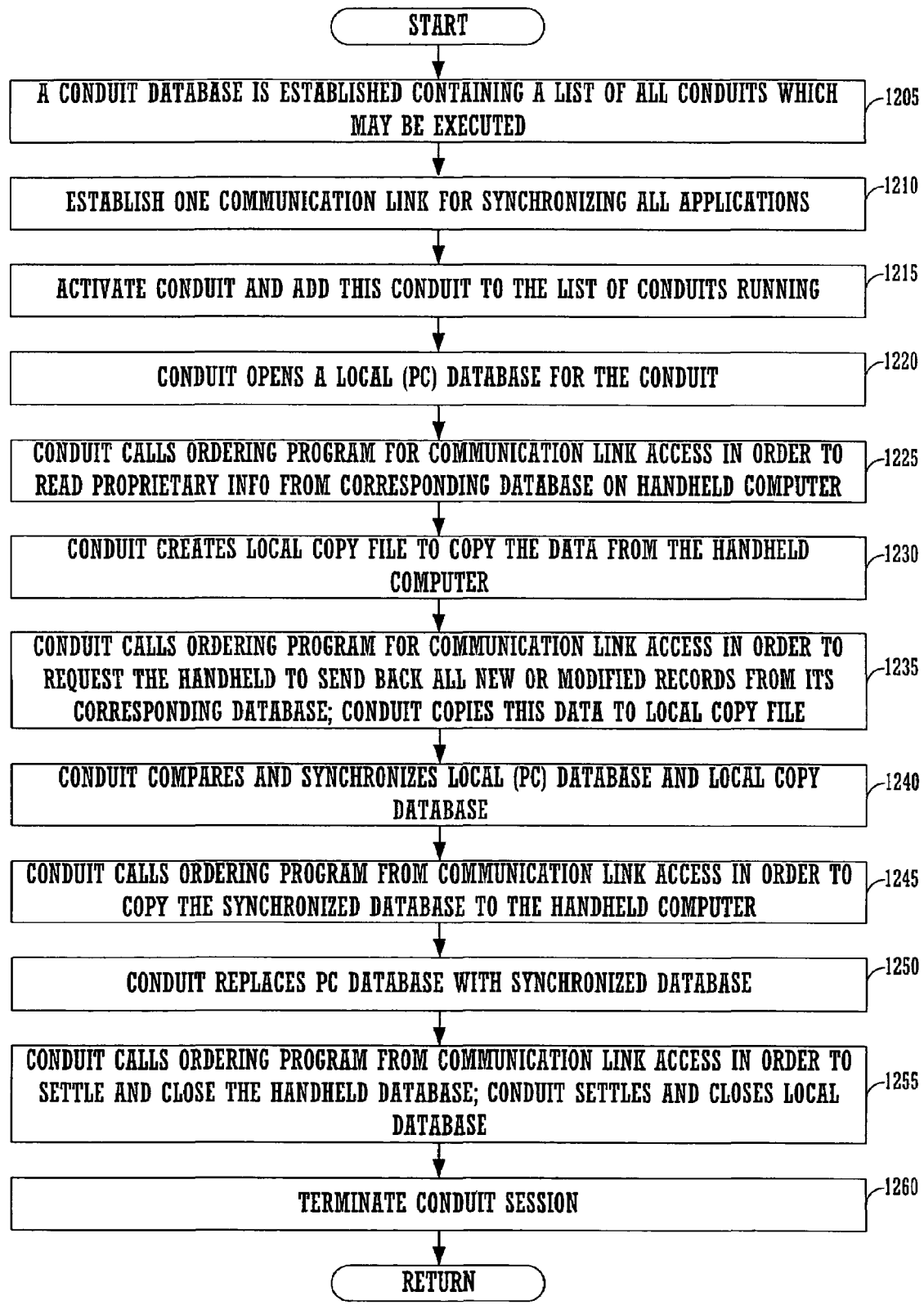
FIG. 12 is a flowchart of the steps of one conduit synchronizing data, in accordance with an embodiment of the present invention.

FIG. 12 is a flowchart showing the steps of one of the conduits synchronizing databases, according to one embodiment of the present invention. In the present invention, all conduits are activated simultaneously; however, FIG. 12 shows only conduit B 422 so as not to obscure aspects of the present invention. Furthermore, the specific steps taken by a conduit will depend on its function. For example, a conduit for exchanging e-mail will perform different steps from those in FIG. 12.

In step 1205, a conduit program database is created on the host computer system 56. This list contains all of the conduit programs that will be simultaneously executed. In step 1210, a single communication link 55 is established for all conduits to use.

In step 1215, conduit B 422 is activated by the sync manager 410 and added to a list of conduits now executing. In step 1220, conduit B 422 opens host database B 442. For example, if conduit B 422 is for synchronizing a calendar application, this database contains data associated with that application on the host computer 56.

In step 1225, Conduit B 422 needs to access the communication link 55 to read proprietary information from palmtop database B 492. Because other conduits are also running at this time, conduit B 422 calls the ordering program 412 to request access to the link 55. In step 1230, conduit B 422 creates a local copy file to copy the data which is transferred from the palmtop system 100.

In step 1235, conduit B again calls the ordering program 412 to gain access to the communication link 55 to request the palmtop 100 to send back all new or modified records from palmtop database B 492. When these records are transferred, conduit B 422 copies them to its local copy file. Because all conduits are running in parallel, other conduits may access the communication link 55 at any time conduit B 422 is not using it. Thus, the present invention is not limited to any particular order of conduit access. For example, in step 1235, it may be advantageous to allow other conduits to have access to the link 55 while the palmtop 100 is determining which records in palmtop database B 492 need to be sent back. Thus, conduit B 422 does not necessarily receive the records from the palmtop in one consecutive stream.

In step 1240 of FIG. 12 conduit B 422 compares and synchronizes the host database B 442 with the local copy database. In step 1245, conduit B 422 calls the ordering program 412 again to access the link 55 in order to copy the synchronized database to the palmtop database B 492.

In step 1250, conduit B 422 updates the host database B 442. In step 1255, conduit B 422 calls the ordering program 412 for access to the link 55 in order to settle and close palmtop database B 492. Conduit B 422 also settles and closes host database B 442.

In step 1260 conduit B's session is terminated. The complete synchronization process continues until all conduits are finished. Because they run simultaneously, the entire process generally could be done in the time it would take the slowest conduit to synchronize solo. However, in practice the complete process may take longer.

Figure 13:
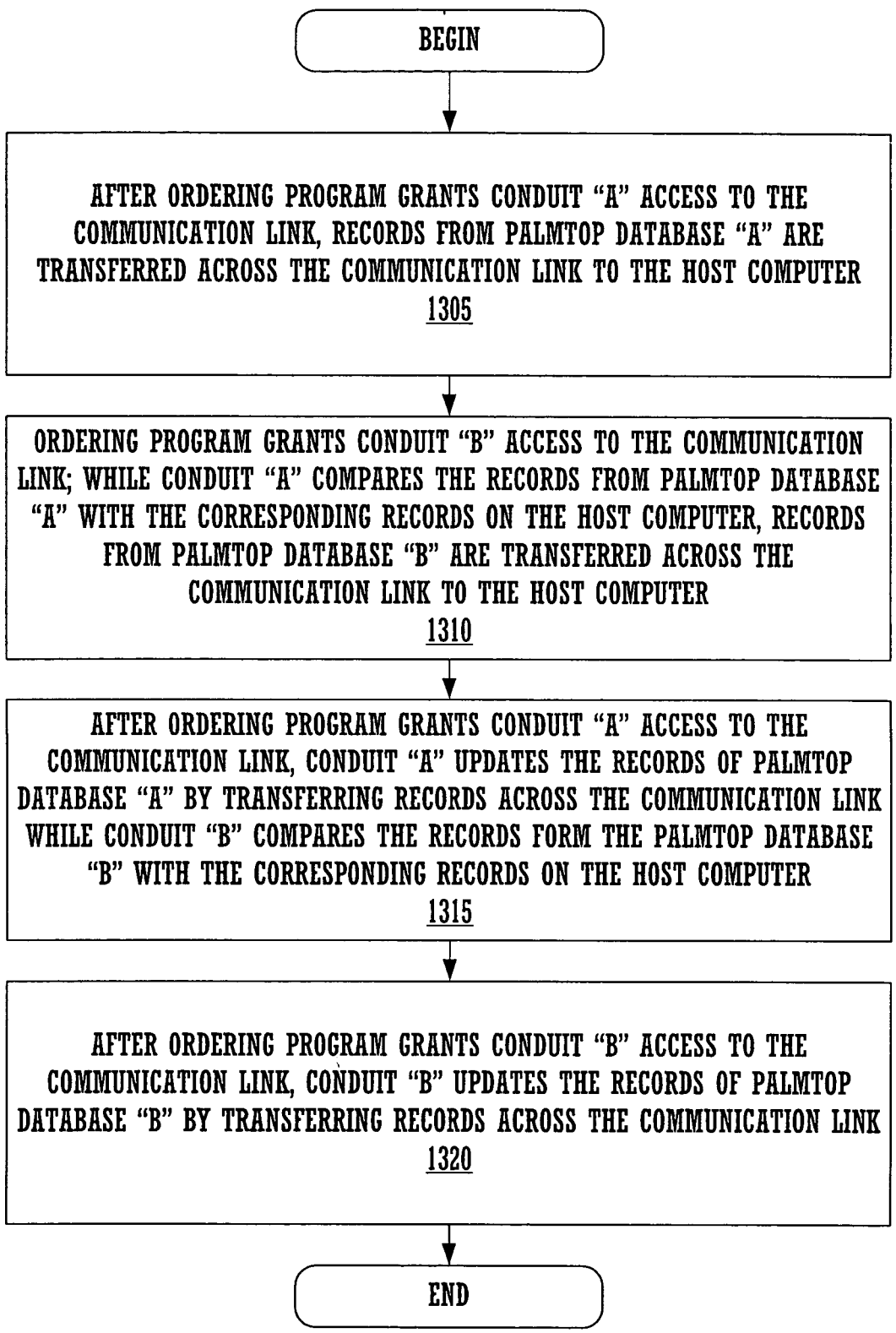
FIG. 13 is a flowchart showing the steps of two conduits simultaneously synchronizing data, in accordance with an embodiment of the present invention.

FIG. 13 is a flowchart showing the steps of two conduits simultaneously synchronizing databases, according to one embodiment of the present invention. In step 1305, records from palmtop database A 491 are transferred across the communication link 55 after ordering program 412 has granted conduit A 421 access to the communication link 55.

In step 1310, while conduit A 421 compares the transferred records with corresponding records on the host computer 100, records from palmtop database B 492 are transferred across the communication link 55 after ordering program 412 (e.g., an arbitrator or queue) has granted conduit B 422 access to the communication link 55.

In step 1315, after ordering program 412 has granted conduit A 421 access to the communication link 55, conduit A 421 updates records in palmtop database a 491 while conduit B 422 compares the records transferred from palmtop database B 491 with corresponding records on the host computer 56.

In step 1320, after ordering program 412 has granted conduit B 422 access to the communication link 55, conduit B 422 updates records on palmtop database B 492. This is only a simplified version of the process, and is shown to illustrate the process of interleaved transfers across the communication link 55. The present invention is well-suited to operating with any number of conduit program running simultaneously. In fact, the present invention may lead to greater gains in efficiency when there are more conduits running, as this could increase the percentage of time the communication link 55 is used.

The preferred embodiment of the present invention, a method and system of synchronizing information between two computer systems using parallel execution of conduits, is thus described. While the present invention has been described in particular embodiments, it should be appreciated that the present invention should not be construed as limited by such embodiments, but rather construed according to the below claims.

What is claimed is:

1. A method of sharing information between a first computer system and a second computer system comprising the steps of:
    a) establishing a communication link between said first computer system and said second computer system;
    b) activating a plurality of conduit programs on said first computer system, wherein said conduit programs execute in parallel; and
    c) said conduit programs synchronizing information on said first computer system with information on said second computer system, wherein said conduit programs initiate time multiplexed information transfers over said communication link while they execute in parallel.

2. The method of claim 1 further comprising the step of
    d) establishing the order in which said plurality of conduit programs receive access to said communication link.

3. The method of claim 2 wherein step d) comprises the step of
    d1) arbitrating the order in which said plurality of conduit programs receive access to said communication link.

4. The method of claim 1 wherein:
    said plurality of conduit programs comprise a first conduit program and a second conduit program; and wherein step c) comprises the steps of:
        c1) said first conduit program initiating a transfer across said communication link while said second conduit program simultaneously performs a non-transfer function; and
        c2) said second conduit program initiating a transfer across said communication link while said first conduit program simultaneously performs a non-transfer function.

5. The method of claim 1 wherein said plurality of conduit programs comprise a first conduit program and a second conduit program; and
    step c) comprises the step of
        c1) said first conduit program updating records in a database on said first computer system while said second conduit program simultaneously initiates a data transfer across said communication link.

6. The method of claim 1 wherein said plurality of conduit programs comprise a first conduit program and a second conduit program; and
    step c) comprises the step of
        c1) said first conduit program initiating a data transfer across said communication link while said second conduit program simultaneously waits for a response from said second computer system.

7. The method of claim 1 wherein said second computer system is a handheld computer system.

8. A host computer system comprising:
    a processor; and
    a computer readable memory coupled to said processor via a bus, said memory having stored therein:
        a communication program operable to establish a communication link between said host computer system and a peripheral electronic device and to control information transfers over said communication link;
        a plurality of conduit programs operable to synchronize information between said host computer system and said peripheral electronic device; and
        a manager program operable to invoke said conduit programs for parallel execution;
        wherein said conduit programs execute in parallel to synchronize information on said host computer system with information on said peripheral electronic device, and further wherein said conduit programs cause said communication program to perform time multiplexed information transfers over said communication link of portions of information being synchronized while said conduit programs execute in parallel.

9. The host computer system of claim 8 wherein said memory further comprises:
    an ordering program operable to order access to said communication link by said plurality of conduit programs.

10. The host computer system of claim 8 wherein a first of said plurality of conduit programs is operable to synchronize a database on said host computer system with a database on said peripheral electronic device.

11. The host computer system of claim 8 wherein a first of said of plurality of conduit programs is operable to install software onto said peripheral electronic device.

12. The host computer system of claim 8 wherein a first of said of plurality of conduit programs is operable to exchange e-mail between said host computer system and said peripheral electronic device.

13. The host computer system of claim 8 wherein said memory comprises a plurality of host databases, and wherein at least two of said plurality of conduit programs simultaneously synchronize said host databases with corresponding databases residing on said peripheral electronic device.

14. A computer readable medium having stored therein instructions that when executed on a processor implement a method of sharing data between a host computer system and an electronic device coupled by a communication link, said method comprising:
    executing a plurality of conduit programs in parallel on said host computer system; and
    said conduit programs synchronizing host data on said host computer system with electronic device data on said electronic device while executing in parallel, wherein said conduit programs initiate time multiplexed transfers over said communication link of data selected from said host data and said electronic device data.

15. The computer readable medium of claim 14 wherein said method further comprises establishing an order in which said plurality of conduit programs receive access to said communication link.

16. The computer readable medium of claim 14 wherein said plurality of conduit programs comprise a first conduit program and a second conduit program, and further wherein said conduit programs synchronizing data comprises:
- said first conduit program retrieving a first set of modified records from a first electronic device database on said electronic device;
- said second conduit program retrieving a second set of modified records from a second electronic device database on said electronic device while said first conduit program compares said first set of modified records with a first host database on said host computer system to create a first synchronized database;
- said first conduit program writing first records from said first synchronized database to said first electronic device database while said second conduit program compares said second set of modified records with a second host database on said host computer system to create a second synchronized database; and
- said second conduit program writing second records from said second synchronized database to said second electronic device database.

17. The computer readable medium of claim 14 wherein said electronic device is a portable computer system.

18. The computer readable medium of claim 14 wherein said electronic device is a handheld computer system.

* * * * *